J. REULEAUX.
REGENERATIVE FURNACE.
APPLICATION FILED OCT. 23, 1913.
1,098,171.
Patented May 26, 1914.
2 SHEETS—SHEET 1.
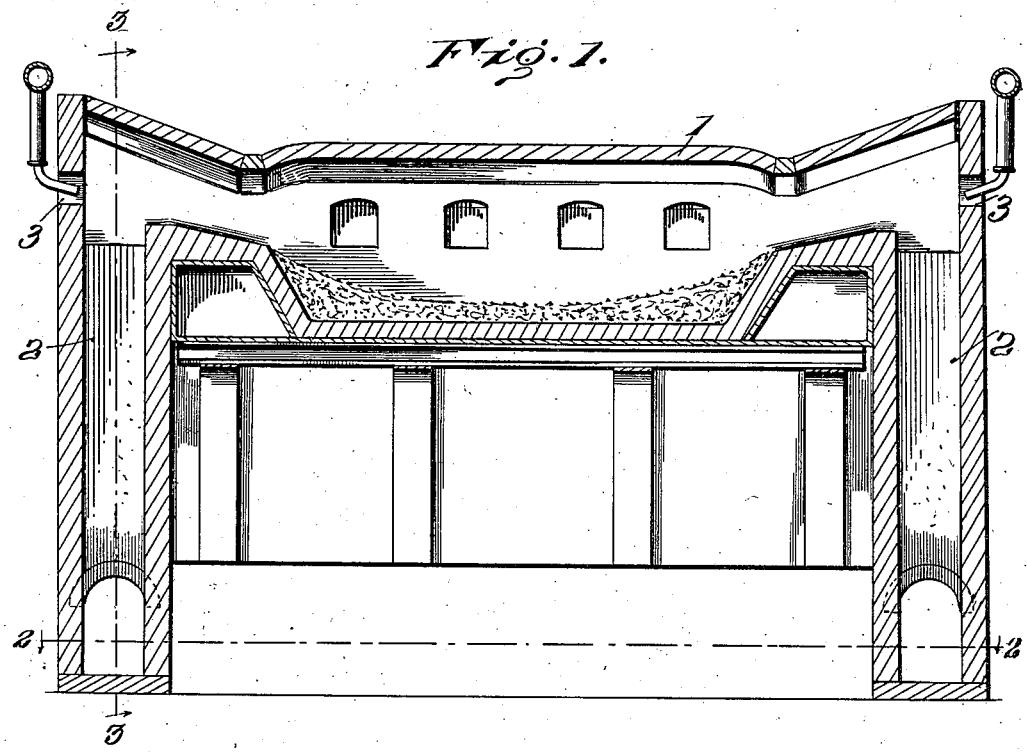
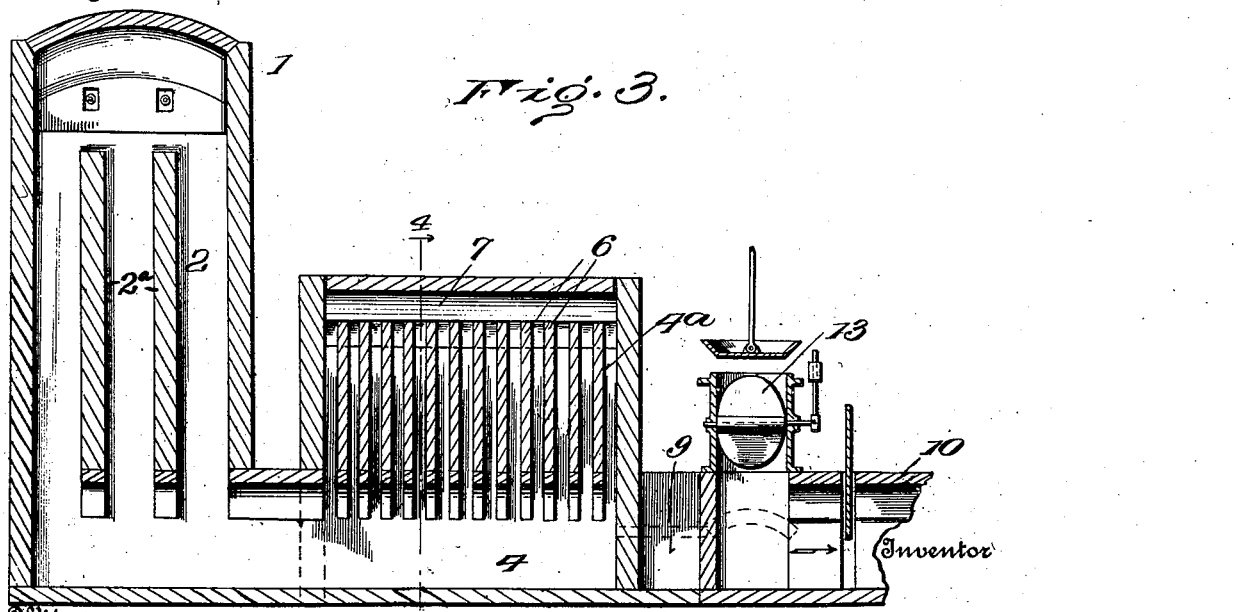
Witnesses
W. A. Williams
Francis ...
Inventor
Josef Reuleaux.
By
... 
Attorney

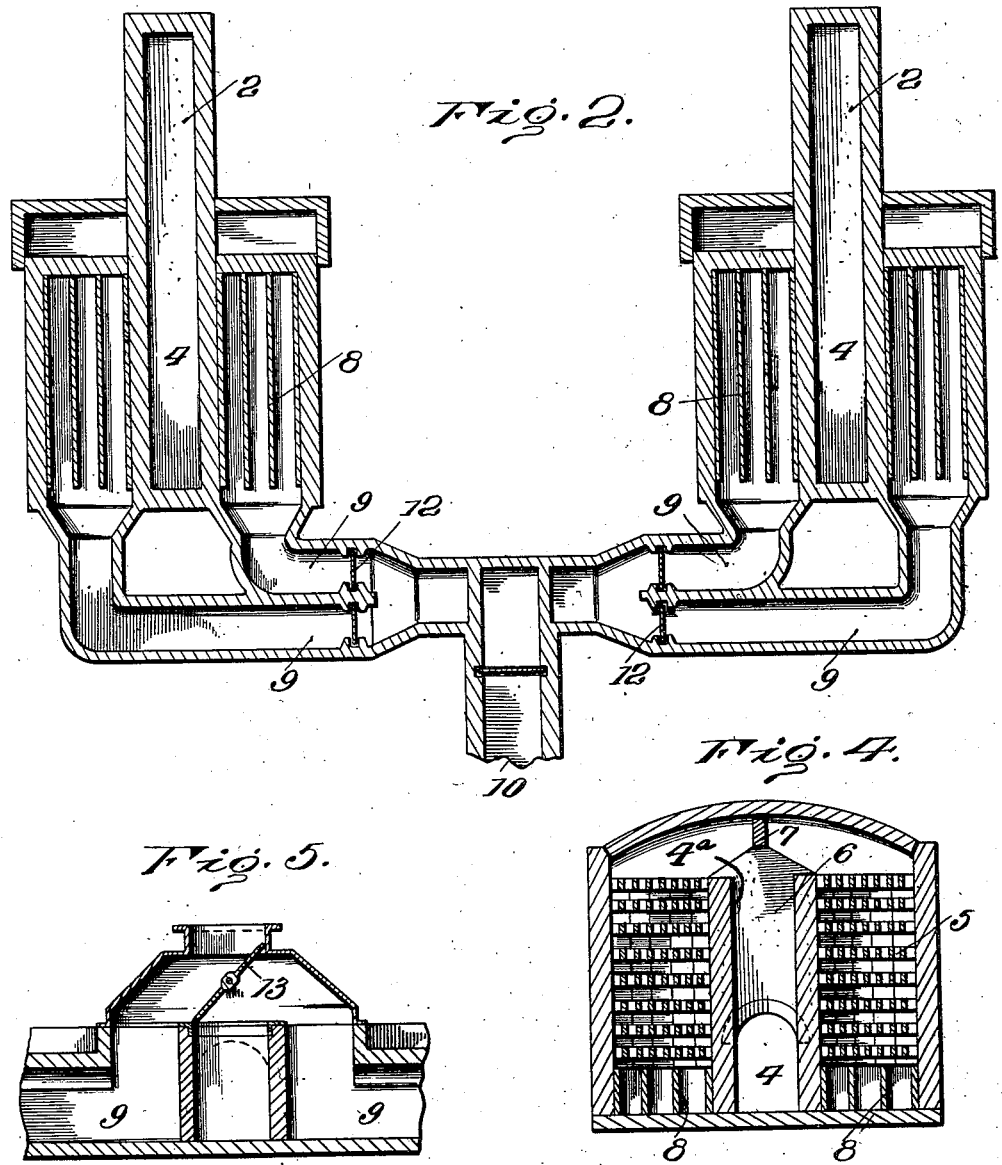

UNITED STATES PATENT OFFICE.

JOSEF REULEAUX, OF PITTSBURGH, PENNSYLVANIA, ASSIGNOR TO ALEXANDER LAUGHLIN, OF PITTSBURGH, PENNSYLVANIA.

REGENERATIVE FURNACE.

1,098,171.  Specification of Letters Patent.  Patented May 26, 1914.

Application filed October 23, 1913.  Serial No. 796,889.

*To all whom it may concern:*

Be it known that I, JOSEF REULEAUX, of Pittsburgh, in the county of Allegheny and State of Pennsylvania, have invented certain new and useful Improvements in Regenerative Furnaces; and I do hereby declare the following to be a full, clear, and exact description of the invention, such as will enable others skilled in the art to which it appertains to make and use the same.

The object of this invention is to prevent dust and other foreign substances from impairing the life or usefulness of regenerative furnaces, and according to my invention before the waste gases reach the checker-work practically all dust is effectively removed therefrom. And a further object is to fully absorb the heat of the waste gases so that the full value thereof may be utilized in heating incoming gases.

In the accompanying drawings, Figure 1 is a longitudinal sectional view of a regenerative furnace constructed in accordance with my invention. Fig. 2 is a horizontal sectional view on line 2—2, Fig. 1. Fig. 3 is a section on line 3—3, Fig. 1. Fig. 4 is a section on line 4—4, Fig. 3. Fig. 5 shows the reversing valve.

Referring to the drawings, 1 designates the furnace which is the Siemens type of open-hearth. At each end of this furnace is a vertically arranged flue or passage 2 which, as is well known, is used alternately for the inlet and outlet of gases. According to the means shown in the drawings the fuel is introduced at points 3. I may use oil or natural gas, or coke-oven gas, or producer gas, coal tar or coal. In fact, my present improvements have been specially designed with reference to the employment of powdered coal as fuel, since there is ordinarily a relatively large proportion of dust in fuel of this character, and this coupled with the sand, rust, scale, lime-dust and fine ores, suspended in outgoing gases, will quickly clog the checker-work in regenerative chambers, and hence shorten the life of the furnace and necessitate expensive repairs.

Each flue 2 is in itself a dust pocket, but it opens directly into a lateral prolongation 4 which may more properly be regarded as the dust pocket. I have shown partitions 2ª in flues 2, but these are not essential and have nothing to do with my invention. Directly above and leading upwardly from this dust pocket is a vertically disposed passage-way 4ª through which the outgoing gas must travel upwardly to the top of a regenerative chamber before passing downwardly through checker-work 5, and thence to the stack. By this tortuous passage of the gas foreign substances are removed therefrom before the checker-work is reached. Preferably the vertically-disposed passage 4ª is at the longitudinal center of the regenerative chamber, and has checker-work 5 on each side thereof, but if desired, the checker-work may be on one side alone. Within the vertically disposed passage 4ª I locate spaced-apart partitions 6, which are preferably solid and which serve to absorb a large proportion of the outgoing heat before reaching the top of the checker-work. A central dividing wall 7 extends transversely of these partitions 6, beneath the roof of the regenerative chamber, so as to equally divide the latter. Of course, if desired, checker-work may be substituted for the solid partitions but the latter are preferable. The checker-work 5 is shown as supported by longitudinally-disposed supports 8, resting on the bottom of the regenerative chamber. The compartments containing the checker-work have separate flues 9 leading therefrom to the stack connection 10, and in each of these flues 9 is a valve 12 for regulating the inflow and outflow of the gases. As is customary a reversing valve 13 controls the inlet and outlet to the respective ends of the furnace.

In practice, the waste gases after leaving the furnace travel first downwardly through flue 2 and then horizontally into the slag and dust pocket within the regenerative chamber wherein they expand and evenly distribute themselves, affording ample opportunity for the discharge of refuse matter before and during their upward course in the passage 4ª toward the top of the regenerative chamber. In this passage through the channels formed between the solid partitions 6 the latter are well heated. From the top of the regenerative chamber the gases pass downwardly through the checker-work and into the collecting flues below and thence through the intermediate dampers 12 to the reversing valve 13, and thence to the stack.

The slag and dust pocket within the regenerative chamber and the upwardly extending passage between it and the checkerwork, prevent any undue transmission of the heat to the atmosphere, and greatly increase the efficiency of the regenerative chamber in bringing the inflowing air or gas to a high temperature.

The advantages of my invention will be readily appreciated by those skilled in the art. It will be observed that by means thereof and regardless of the character of the fuel employed, the full value of the waste heat may be utilized for preheating the incoming air or gas and without danger of clogging up or otherwise endangering the checker-work.

I claim as my invention:

1. A furnace having a descending flue at its end, a regenerative chamber having a slag and dust pocket into which said flue opens, an upwardly-extending flue passage above and leading from said pocket and through which the waste heat is designed to ascend, and checker-work through which the waste heat is designed to descend.

2. A furnace having a descending flue at its end, a regenerative chamber having a slag and dust pocket opening laterally from and in the same vertical plane as said flue, an upwardly extending flue passage above and leading from said pocket and through which the waste heat is designed to ascend, and checker-work through which the waste heat is designed to descend.

3. A furnace having a descending flue at its end, a regenerative chamber having a slag and dust pocket into which said flue opens, an upwardly-extending passage leading from said pocket and through which the waste heat is designed to ascend, said upwardly-extending passage having a series of narrow channels, and checker-work through which the waste-heat is designed to descend after leaving said channels.

4. A furnace having a descending flue at its end, a regenerative chamber having a slag and dust pocket into which said flue opens, an upwardly-extending passage leading from said pocket and through which the waste heat is designed to ascend, said upwardly-extending passage having a series of solid partitions extending transversely thereof forming narrow channels, and checker-work through which the waste-heat is designed to descend after leaving said channels.

5. A furnace having a descending flue at its end, a regenerative chamber having a slag and dust pocket into which said flue opens, an upwardly-extending passage leading from said pocket and through which the waste heat is designed to ascend, and checker-work at opposite sides of said passage and through which the waste heat is designed to descend after leaving said passage.

6. A furnace having a descending flue at its end, a regenerative chamber having a slag and dust pocket into which said flue opens, an upwardly-extending passage leading from said pocket and through which the waste heat is designed to ascend, said chamber having two compartments at opposite sides of said passage, checker-work in said compartments, outlet flues leading from said compartments, and separate valves for said flues.

In testimony whereof, I have signed this specification in the presence of two subscribing witnesses.

JOSEF REULEAUX.

Witnesses:
FRANCIS S. MAGUIRE,
MILDRED P. IMIRIE.